US006402507B1

(12) United States Patent
Boettger

(10) Patent No.: US 6,402,507 B1
(45) Date of Patent: Jun. 11, 2002

(54) TUNNEL FURNACE ROLLER ASSEMBLY

(75) Inventor: Bruce A. Boettger, Lima, OH (US)

(73) Assignee: Cast Masters, Inc., Bowling Green, OH (US)

( * ) Notice: Subject to any disclaimer, the term of this patent is extended or adjusted under 35 U.S.C. 154(b) by 0 days.

(21) Appl. No.: 09/693,049

(22) Filed: Oct. 20, 2000

(51) Int. Cl.[7] ............................................ A01B 29/04

(52) U.S. Cl. ......................... 432/236; 432/246; 492/30; 492/46

(58) Field of Search ......................... 432/60, 228, 236, 432/246; 492/30, 46; 193/37

(56) References Cited

U.S. PATENT DOCUMENTS 1,923,773 A * 8/1933 Carpenter ................... 432/246
1,927,634 A * 9/1933 Fahrenwald ................ 432/236
3,115,335 A * 12/1963 Ornitz et al. ............... 432/236
5,421,724 A * 6/1995 Facco ......................... 432/236
5,448,040 A * 9/1995 Deplano et al. ............ 432/236

* cited by examiner

*Primary Examiner*—Gregory Wilson
(74) *Attorney, Agent, or Firm*—Brinks Hofer Gilson & Lione

(57) ABSTRACT

A tunnel or reheat furnace roller assembly includes a hollow tube or arbor of low alloy steel and an inner concentric tube for providing a flow of cooling water. About the exterior of the tube or arbor is cast a surround or jacket having larger diameter, spaced apart wheels which engage and support workpieces in the furnace and integrally formed intermediate smaller diameter regions. The integral surround is preferably cast of Waspaloy or other high temperature, nickel alloy steel.

16 Claims, 3 Drawing Sheets

TUNNEL FURNACE ROLLER ASSEMBLY

BACKGROUND OF THE INVENTION

The invention relates generally to water-cooled rollers for tunnel or reheat furnaces and more specifically to water-cooled rollers for tunnel or reheat furnaces having integrally cast rollers and intermediate regions disposed on the exterior of a hollow shaft or arbor.

The production of steel billets, bars, plates, slabs and strips may be accomplished continuously through a continuous vertical pour from a tundish which is quickly cooled by water spray and shaped in a series of opposed pairs of rollers. The rollers describe an arc extending from a vertical to a horizontal orientation where the material is sheared into appropriate lengths. Typically, such rapid cooling cools the exterior of the material sufficiently so that it can be handled and treated but leaves the interior at a much higher temperature, in a nearly molten state.

In order to equalize the temperature throughout the metal, it is next provided to a tunnel or reheat furnace which provides both a defined residence time and exterior reheating to achieve temperature uniformity throughout the workpiece in order to facilitate subsequent forming operations. In the tunnel furnace, the metal is moved along a plurality of rollers while being reheated by a plurality of natural gas-fired heaters disposed along the furnace.

Clearly, the service conditions of the rollers, operating in an environment of 2000° F. (1095° C.) to 2300° F. (1260° C.), carrying metal bars or slabs at the same temperatures and subjected to cyclic loading from the individual bars or slabs carried thereover are best described as inhospitable. Furthermore, the gas heaters generally operate with excess air and thus the atmosphere within the furnace is an oxidizing atmosphere. Such operating conditions conspire to shorten the operating life of tunnel furnace rollers. Furthermore, while teardown and replacement of such rollers in a furnace is, in itself, costly, the down time of the steel producing facility can represent an even greater expense.

Accordingly, significant effort has been directed to improving the performance and extending the service life of such furnace rollers. U.S. Pat. Nos. 3,860,387 and 4,991,276 teach furnace rollers having inner arbors, outer tubes and tires which support the metal slabs or plates as they pass through the furnace.

U.S. Pat. No. 5,230,618 teaches an insulated furnace roller wherein a refractory is cast about the arbor in regions intermediate the tires which support the slabs or plates in the furnace. Products incorporating the just recited technology exhibit improved service life over prior devices.

From the foregoing, it is apparent that the cost of replacement calculated as both the actual cost of roller replacement and down time of the furnace continues to support efforts to develop and improve tunnel furnace rollers. The present invention is directed to such an improved device.

SUMMARY OF THE INVENTION

A tunnel or reheat furnace roller assembly includes a hollow tube or arbor of low alloy steel and an inner concentric tube for providing a flow of cooling water. About the exterior of the tube or arbor is cast a jacket or surround having a plurality of larger diameter, spaced apart wheels which engage and support workpieces in the furnace and integrally formed intermediate smaller diameter regions. The integral surround is preferably cast of Waspaloy or other high temperature, nickel alloy steel. Waspaloy is a trademark of United Technologies, Inc. for its brand of high temperature, nickel alloy steel. The wheels are preferably slightly offset from the longitudinal center of the roller assembly and alternate roller assemblies are reversed end to end when installed in the furnace such that the wheels present an evenly and equally offset or staggered wheel pattern.

Thus it is an object of the present invention to provide a furnace roller having wheels or tires and integrally cast intermediate regions of smaller diameter.

It is a further object of the present invention to provide a furnace roller having integrally cast wheels or tires and intermediate regions of smaller diameter disposed upon a water-cooled tubular shaft or arbor.

It is a still further object of the present invention to provide a furnace roller having integrally cast wheels or tires spaced apart by smaller diameter intermediate regions fabricated of Waspaloy.

It is a further object of the present invention to provide a furnace roller installation wherein wheels of adjacent roller assemblies are arranged in an offset or staggered pattern.

It is a still further objection of the present invention to provide a furnace roller having integrally cast wheels and intermediate regions which exhibit improved service life.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
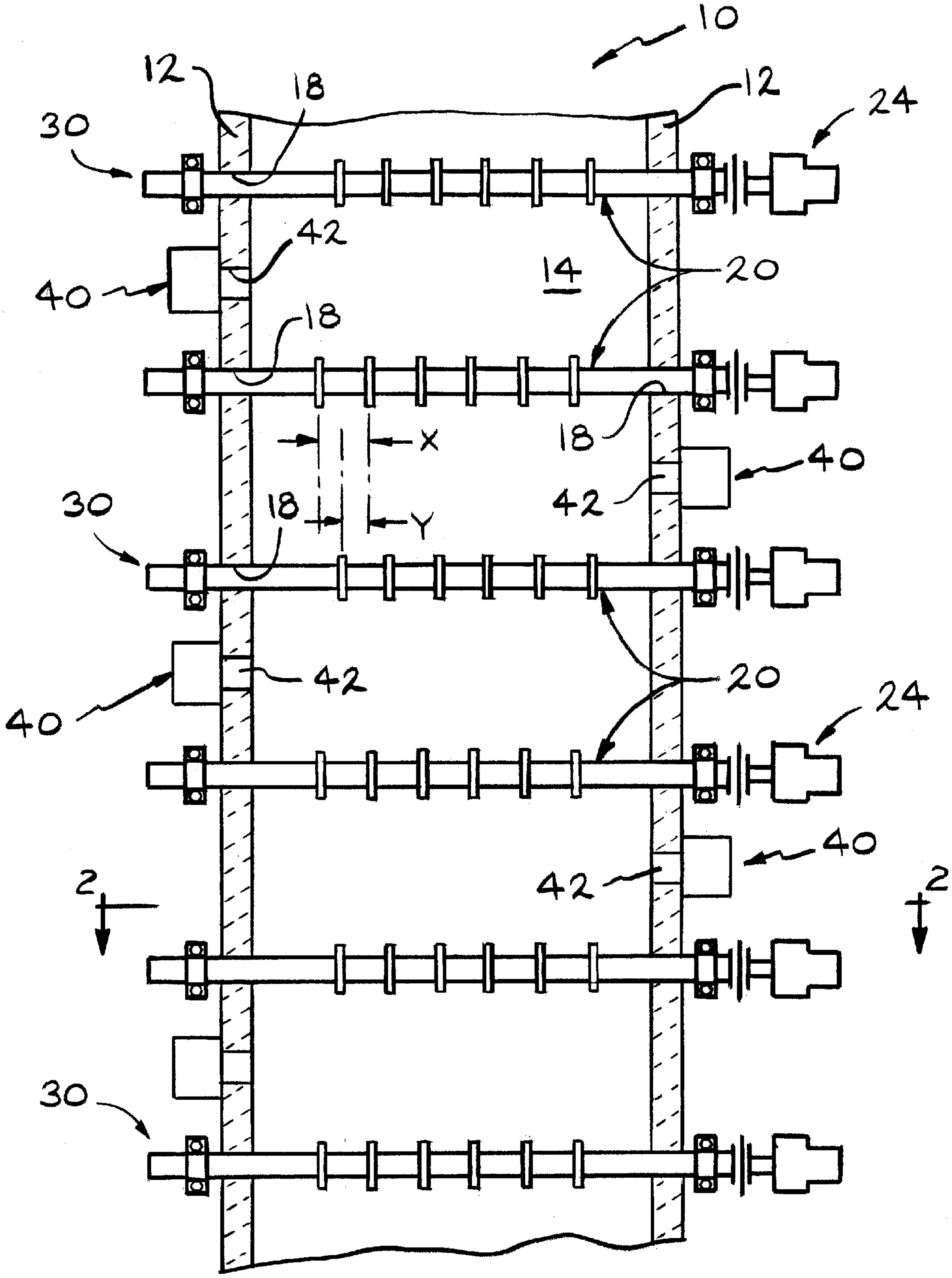
FIG. 1 is a top, plan view of a tunnel or reheat furnace utilizing rollers according to the present invention.

Referring now to FIG. 1, a portion of a tunnel or reheat furnace incorporating the present invention is illustrated and designated by the reference number 10. The tunnel furnace 10 includes parallel spaced apart vertical refractory sidewalls 12 as well as top and bottom walls (not illustrated) which define an interior 14 through which a workpiece 16 passes. The workpiece 16 may be a bar, billet, strip, slab or other shape previously formed and provided to the tunnel furnace 10 at an elevated temperature. The vertical refractory side walls 12 define a plurality of pairs of aligned openings 18 which receive a plurality of roller assemblies 20. A typical tunnel furnace 10 will contain between 54 and 128 roller assemblies 20.

The roller assemblies 20 are supported for rotation at their ends upon pairs of pillow blocks 22. At one end of each of the roller assemblies 20 is a drive assembly 24 which typically includes an electric motor 26 and a speed reduction assembly 28 which provides a reduced speed and increased torque drive to the associated roller assembly 20. At the opposite end of each of the roller assemblies 20 is a rotary fluid coupling or union 30 which is stationary and includes relatively rotatable features which provide or inject a flow of cooling water at low temperature from a first pipe or conduit 32 into the roller assembly 20 and withdraw or extract this same flow of cooling water at an elevated temperature through a second pipe or conduit 34. Preferably, relatively small rectangular or cylindrical plugs 38 in the sidewalls 12 of the tunnel furnace 10 which are removeably secured thereto by suitable fasteners (not illustrated) facilitate service and replacement of the roller assemblies 20.

Disposed at intervals along the sidewalls 12 of the tunnel furnace 10 are gas-fired heaters 40 which provide jets of hot gas (not illustrated) through ports 42 in the sidewalls 12 which reheat the workpieces 16 as they pass through the tunnel furnace 10. The size (BTU output) and number of the heaters 40 are such that they are capable of maintaining the interior 14 of the tunnel furnace 10 at temperatures in the range of 2000° F. (1095° C.) to 2300° F. (1260° C.).

Figure 2:
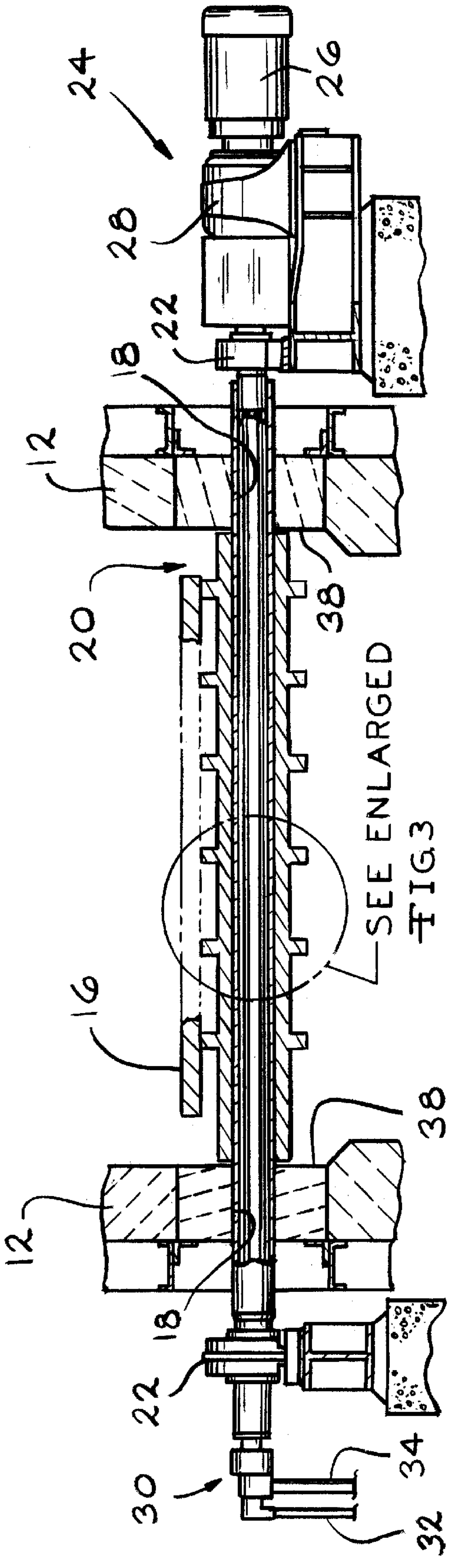
FIG. 2 is a full, sectional view of a furnace roller according to the present invention disposed in a tunnel or reheat furnace and taken along line 2—2 of FIG. 1.
Figure 3:
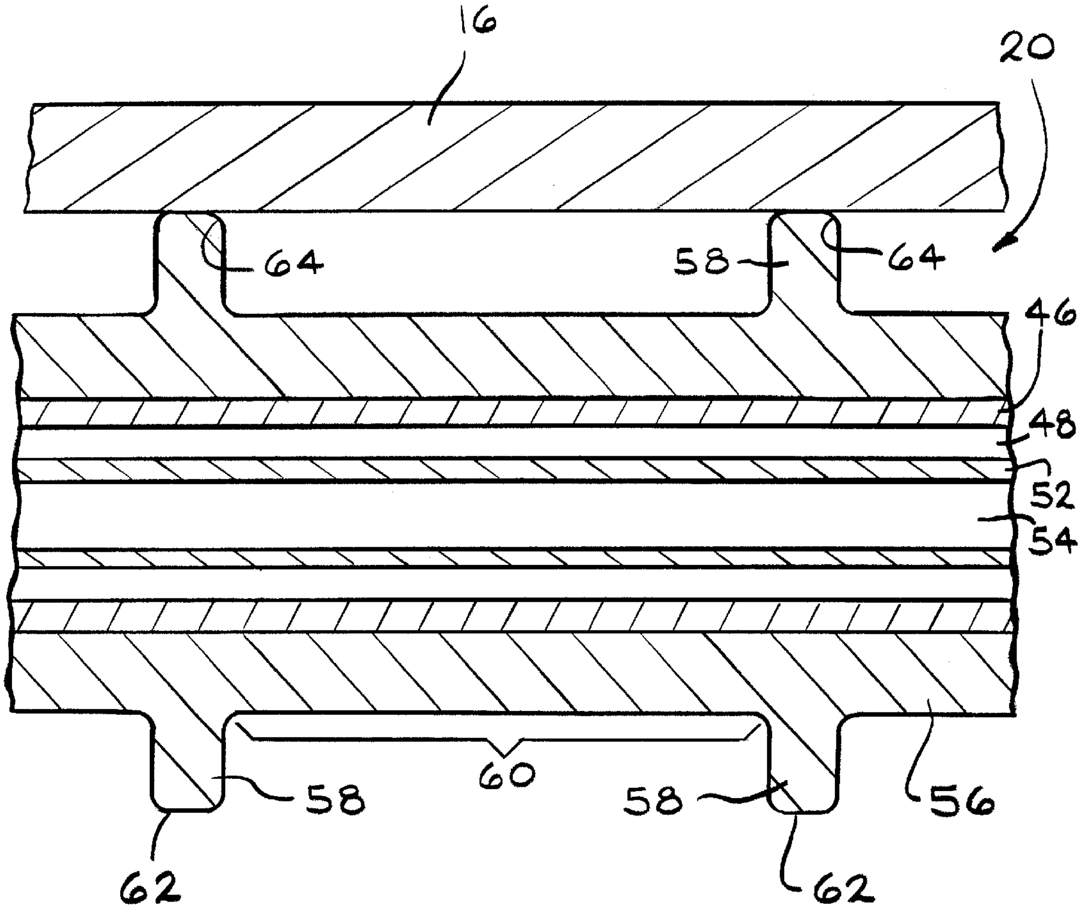
FIG. 3 is an enlarged, fragmentary view of a furnace roller according to the present invention.

Turning now to FIGS. 2 and 3, each of the plurality of roller assemblies 20 includes an elongate arbor or tubular shaft 46 which extends the full width of the tunnel furnace 10 and is supported for rotation in the pillow blocks 22. The tubular shaft 46 is preferably fabricated of a low alloy steel. The tubular shaft 46 defines an annular passageway 48 which is also defined by a coaxially disposed tube or conduit 52 having an interior circular passageway 54. Cooling water flows in one direction through the annular passageway 48 and in the opposite direction through the circular passageway 54 to remove heat from the roller assembly 20 according to conventional practice.

Cast directly on the outer surface of the arbor or tubular shaft 46 is a jacket or surround 56 of a high temperature, nickel alloy steel. Integrally cast with the jacket or surround 56 are a plurality of spaced apart, annular projections or wheels 58. Typically, four to six wheels 58 are included on each roller assembly 20 although more or fewer may be utilized if desired or necessary. The annular projections or wheels 58 are separated by regions 60 of smaller diameter and include outer peripheral surfaces 62 and rounded (radiused) corners 64 which engage and support the workpiece 16 as it traverses the tunnel furnace 10.

As illustrated in FIG. 1, it is preferable that the wheels 58 be disposed on adjacent roller assemblies 20 in staggered or offset patterns such that the longitudinal locations of support or contact with the workpiece 16 by the peripheral surfaces 62 of the wheels 58 do not define a plurality of constant paths but at least two offset pluralities of paths such that the likelihood of generating longitudinal tracks or marks in the workpiece 16 is minimized. By selecting an appropriate offset of each of the wheels 58 on a given roller assembly 20 from a reference point such as the longitudinal center of the roller assembly 20, only a single roller assembly 20 configuration must be fabricated which improves manufacturing efficiency. An offset of 25% (one quarter) of the distance between adjacent wheels 58 of all the wheels 58 on the roller assemblies 20 is preferred and results in the wheels 58 being disposed in an evenly axially staggered pattern when every other roller assembly 20 is reversed end for end before it is installed in the tunnel furnace 10. As illustrated in FIG. 1, the reference distance X represents the spacing between adjacent wheels 58 on one of the roller assemblies 20. The distance Y is preferably X/2, i.e., one-half X, such that the wheels 58 on adjacent roller assemblies 20 are evenly and equally staggered or offset, as described above.

Preferably, the exterior surround 56 and the wheels 58 are cast of a high temperature, nickel steel alloy such as Waspaloy (also known as Carpenter Waspaloy), Inconel 100, Inconel 713. Inconel 718, MO-RE 2, 22H, Super 22H, Supertherm and metal alloys designated AISI 685. For purposes of disclosure, reference and in order to set forth the nominal parameters of metal alloys having the desired heat resistance, strength and serviceability, detailed descriptions of the foregoing metal alloys follow:

TABLE I

| | | |
|---|---|---|
| Material: Waspaloy | | |
| Manufacturer: United Technologies, Inc. | | |
| Chemical Composition: | Carbon | 0.02–0.10 wt. % |
| | Manganese | 0.50 max. |
| | Silicon | 0.75 max. |
| | Sulfur | 0.020 max. |
| | Chromium | 18.0–21.0 |
| | Molybdenum | 3.50–5.0 |
| | Cobalt | 12.0–15.0 |
| | Titanium | 2.6–3.25 |
| | Aluminum | 1.0–1.50 |
| | Zirconium | 0.02–0.12 |
| | Boron | 0.003–0.008 |
| | Copper | 0.10 max. |
| | Iron | 2.0 max. |
| | Nickel | Balance |
| Material: Inconel 100 | | |
| Manufacturer: The International Nickel Company, Inc. | | |
| Chemical Composition: | Carbon | 0.15–0.20 wt. % |
| | Chromium | 8.00–11.00 |
| | Cobalt | 13.00–17.00 |
| | Molybdenum | 2.00–4.00 |
| | Titanium | 4.50–5.00 |
| | Aluminum | 5.00–6.00 |
| | Vanadium | 0.70–1.20 |
| | Zirconium | 0.03–0.09 |
| | Boron | 0.01–0.02 |
| | Iron | 1.00 max. |
| | Manganese | 0.20 max. |
| | Silicon | 0.20 max. |
| | Sulfur | 0.015 max. |
| | Nickel | Balance |
| Material: Inconel 713C | | |
| Manufacturer: The International Nickel Company, Inc. | | |
| Chemical Composition: | Carbon | 0.20 max. wt. % |
| | Manganese | 1.0 max. |
| | Sulphur | 0.015 max. |
| | Silicon | 1.0 max. |
| | Chromium | 11.0–14.0 |
| | Molybdenum | 3.5–5.5 |
| | Titanium | 0.25–1.25 |
| | Aluminum | 5.5–6.5 |
| | Iron | 5.0 max. |
| | Columbium + Tantalum | 1.0–3.0 |
| | Nickel | Balance |
| Material: Inconel 718 | | |
| Manufacturer: The International Nickel Company, Inc. | | |
| Chemical Composition: | Carbon | 0.10 max. wt. % |
| | Silicon | 0.75 max. |
| | Manganese | 0.50 max. |
| | Copper | 0.75 max. |
| | Nickel | 50.0–55.0 |
| | Chromium | 17.0–21.0 |
| | Columbium* | 4.5–5.75 |
| | Molybdenum | 2.8–3.3 |
| | Aluminum | 0.2–1.0 |
| | Titanium | 0.3–1.3 |
| | Iron | Balance |
| Material: MO-RE 2 | | |
| Manufacturer: West Homestead Engineering Co. | | |
| Chemical Composition: | Nickel | 48.00–52.00 wt. % |
| | Carbon | 0.15–0.25 |
| | Chromium | 32.00–34.00 |
| | Manganese | 0.30 max. |
| | Silicon | 0.30 max. |
| | Tungsten | 15.00–17.00 |
| | Molybdenum Al | 0.75–1.25 |
| | Sulfur | 0.04 max. |
| | Phosphorus | 0.04 max. |
| Material: 22-H | | |
| Manufacturer: West Homestead Engineering Co. | | |
| Chemical Composition: | Nickel | 46.00–50.00 wt. % |
| | Carbon | 0.40–0.60 |
| | Chromium | 26.00–30.00 |

TABLE I-continued

| | | |
|---|---|---|
| | Manganese | 1.50 max. |
| | Silicon | 1.75 max. |
| | Tungsten | 4.00–6.00 |
| | Sulfur | 0.04 max. |
| | Phosphorus | 0.04 max. |
| Material: Super 22-H | | |
| Manufacturer: West Homestead Engineering Co. | | |
| Chemical Composition: | Nickel | 46.00–50.00 wt. % |
| | Carbon | 0.40–0.60 |
| | Chromium | 26.00–30.00 |
| | Manganese | 1.50 max. |
| | Silicon | 1.75 max. |
| | Tungsten | 4.00–6.00 |
| | Molybdenum | 0.50 max. |
| | Cobalt | 2.50–4.00 |
| | Sulfur | 0.04 max. |
| | Phosphorus | 0.04 max. |
| Material: Supertherm | | |
| Manufacturer: Abex Co. | | |
| Chemical Composition: | Carbon | 0.50 wt. % |
| | Manganese | 0.70 max. |
| | Silicon | 1.60 max. |
| | Chromium | 26.0 |
| | Nickel | 35.0 |
| | Cobalt | 15.0 |
| | Tungsten | 5.0 |

*Plus incidental tantalum

It will be appreciated that the foregoing delineation of suitable specific metal alloys is not intended to be exhaustive but is rather provided as a guide to present those compositions which are suitable and thus indicate nominal ranges of suitable constituents and compositions. It is anticipated that other alloys having compositions generally within the ranges taught above will also be suitable for use as described herein.

It will also be appreciated that a furnace roller assembly 20 according to the present invention provides improved service life because the unitary construction of the cast jacket or surround 56 and the wheels 58 minimizes thermal stresses caused by different thermal expansion rates which plagued many prior art roller designs assembled from multiple materials such as metal and ceramic.

The foregoing disclosure is the best mode devised by the inventor for practicing this invention. It is apparent, however, that apparatus and methods incorporating modifications and variations will be obvious to one skilled in the art of tunnel and reheat furnace rollers. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A furnace roller assembly adapted to support a workpiece in a tunnel furnace comprising, in combination, a tubular support defining an exterior surface, an interior region and having a first, closed end and a second end, a tube disposed in said interior region and extending from said second end of said tubular support to proximate said first, closed end to provide co-axial coolant passageways, and a unitary, cast jacket of a high temperature, nickel steel alloy disposed about said exterior surface of said tubular support, said cast jacket including at least two spaced apart solid wheels and a reduced diameter intermediate, region between said wheels.

2. The furnace roller assembly of claim 1 further including a rotary fitting disposed at said second end of said tubular support, said fitting providing fluid communication with said tube.

3. The furnace roller assembly of claim 1 further including a rotary drive assembly coupled to said first, closed end of said tubular support.

4. The furnace roller assembly of claim 1 wherein said jacket includes at least four wheels and three of said intermediate regions.

5. The furnace roller assembly of claim 4 wherein said jacket and said wheels are a unitary casting.

6. The furnace roller assembly of claim 1 further including a union at one end of said tubular support for coupling water supply lines to said roller assembly.

7. A furnace roller assembly adapted to support a workpiece in a tunnel furnace comprising, in combination, an elongate tubular shaft defining an exterior surface, an interior space, a closed end and an open end, and a unitary, cast metal jacket of high temperature, nickel steel alloy disposed about said exterior surface of said tubular shaft, said jacket including a plurality of spaced apart larger diameter regions and a plurality of reduced diameter regions between said larger solid diameter regions.

8. The furnace roller assembly of claim 7 further including a rotary drive assembly coupled to one end of said tubular support.

9. The furnace roller assembly of claim 7 further including an elongate tube disposed in said interior space of said elongate tubular shaft and having a first open end adjacent said open end of said tubular shaft and a second open end proximate said closed end of said tubular shaft.

10. The furnace roller assembly of claim 7 further including a union at one end of said tubular support for coupling at least one fluid supply line to said roller assembly.

11. The furnace roller assembly of claim 7 further including a second furnace roller assembly disposed adjacent said furnace roller assembly and wherein said larger diameter region of said roller assemblies are disposed in staggered relationship.

12. A furnace roller assembly adapted to support a workpiece in a tunnel furnace comprising, in combination, a tubular support defining an exterior surface, an interior region, a first, closed end and a second end having a rotary fitting providing fluid communication with said interior region, a tube disposed within said interior region and having a first open end proximate said first, closed end of said tubular support and a second end in fluid communication with said rotary fitting, and a metal surround of high temperature steel nickel alloy disposed about the said exterior surface of said tubular support, said surround including regions of larger diameter alternating with regions of reduced diameter.

13. The furnace roller assembly of claim 12 wherein said surround is cast of Waspaloy.

14. The furnace roller assembly of claim 12 further including a rotary drive assembly coupled to said closed end of said tubular support.

15. The furnace roller assembly of claim 12 wherein said rotary fitting includes a union at one end of said tubular support for coupling at least one fluid supply line to said roller assembly.

16. The furnace roller assembly of claim 12 wherein said furnace roller assembly is installed in a furnace having a plurality of gas heaters.

* * * * *